United States Patent Office.

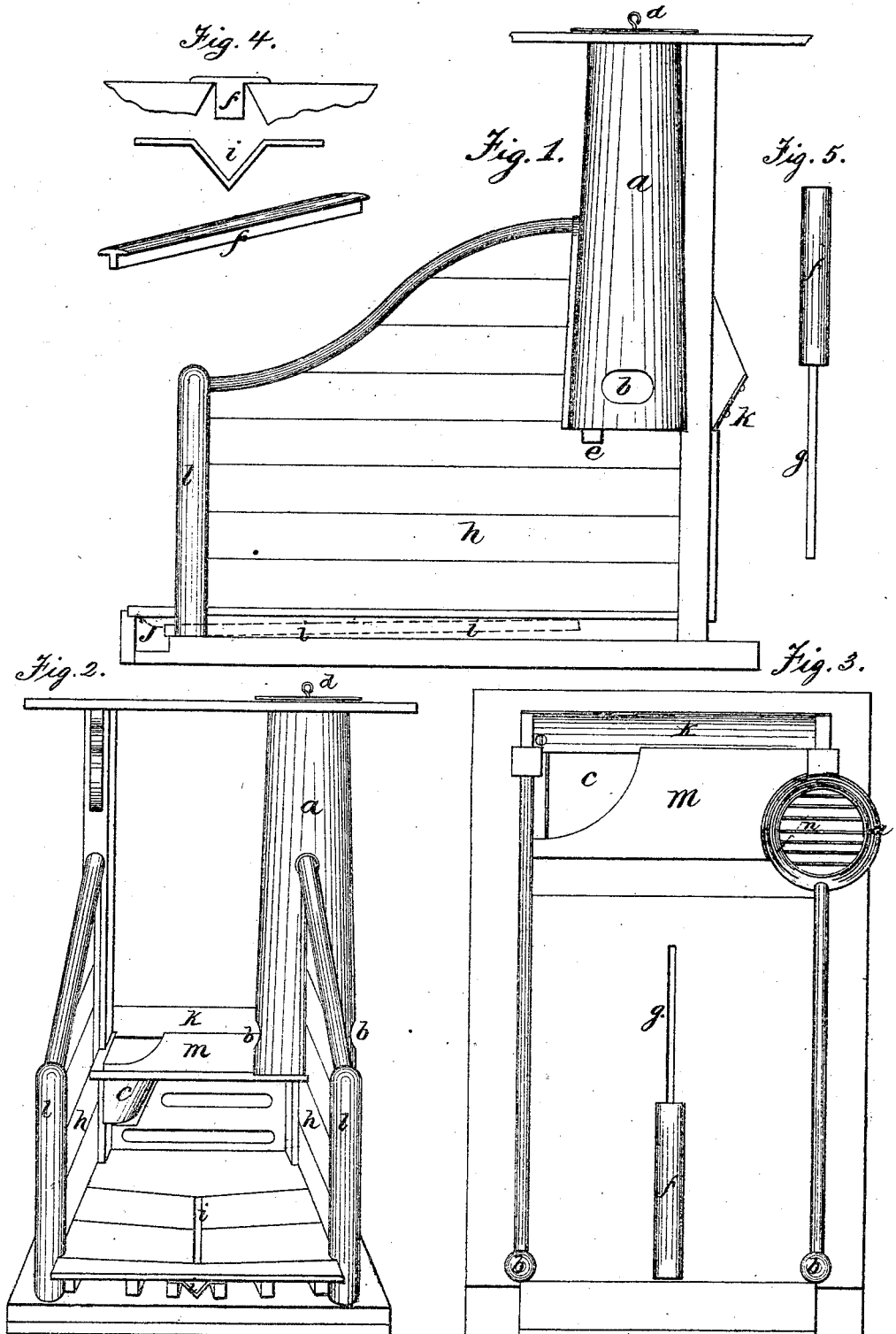

JOHN WILKINSON, OF BALTIMORE, MARYLAND.

Letters Patent No. 114,241, dated April 25, 1871.

IMPROVEMENT IN HORSE-STALLS.

The Schedule referred to in these Letters Patent and making part of the same.

I, JOHN WILKINSON, of the city of Baltimore and State of Maryland, have invented certain Improvements in Horse-Stalls, of which the following is a specification.

The first part of my invention relates to substituting for the common hay-rack or box a vertical hay-tube, which rests upon a platform of lattice-work and extends, cone-shaped, upwardly into the hay-loft, having a cover and two oblong apertures in opposite sides near its base, from which two horses can feed from their respective stalls.

The object of this part of my invention is to afford a convenient means of feeding the hay to the horses, sift the dust through the lattice-work, prevent the hay from absorbing the ammonia and other filth that arises from the excrements of the horse, and retain the juices that otherwise evaporate.

The second part of my invention relates to giving the slot that conveys the urine, &c., through the floor of the stall greater width at its bottom, or a conical form; constructing the conduit that conveys the urine, &c., from the stall into the main gutter with flanges, and suspending it upon sills immediately under the slot V, so as to enable the stable-man to clean it more conveniently; also, in providing a T-shaped slot-cover, capable of being moved back and forth in the slot, or removed at pleasure.

The object of an inclination to the center of the stall is to give the horse an easy position when down and secure a better drainage of the urine. The slot and main gutter-covers insure a minimum evaporating surface and prevent accident to the horse from stepping into the main gutter, and the floating of ammonia, &c., in the stall.

The third part of my invention relates to a platform having a slobber-board elevated in its front to prevent the waste of feed. Immediately under this platform I suspend a hinged manger, or it can be recessed into the platform.

Figure 1 is a side elevation.
Figure 2 is an end elevation.
Figure 3 is a plan.
Figure 4 shows the shape of the slot.
Figure 5 shows the position of the slot when a mare is in the stall.

The same figure (5 in the plan) shows the position of the slot-cover $f$ when a male horse is in the stall.

Like letters refer to like parts.

$a$ is the hay-tube resting upon the lattice-work $n$ in the center of the partition of each alternate stall. It extends up into the hay-loft and is covered with the lid $d$.

I construct the hay-tube about twenty inches internal diameter at the base and about sixteen inches at the top, which gives free descent to the hay to the apertures $b$, which are constructed on each side of the tube near its base, from which the horses draw the hay from their respective stalls.

$c$ is one of my hinged mangers that is constructed to swing under the aperture in the platform or table $m$.

$e$ is the tie-rail, to which the halters are attached.

$f$ is a T-shaped slot-cover, the stem of which passes into the slot $g$. When a horse is in the stall it should be back, as shown in the plan. When a mare occupies the stall, front, as shown in fig. 5, as the latter urinates further to the rear.

$g$ is a slot in the center of each stall, having an opening at the surface of the floor of about one-half, diverging downwardly to about one inch to two inches of plank.

$i$ is the metal conduit leading into the main gutter $j$.

$k$ is the slobber-board.

$l$, the stall-posts.

$m$, the platform.

$n$, the lattice-work under the hay-tube, for sifting the dust, &c., from the hay.

I claim as my invention—

1. The combination of the hay-tube $a$, apertures $b$, cover $d$, and lattice-work $n$, constructed in the manner and for the purpose substantially as set forth.

2. The slot $g$, undercut as shown, in combination with the flanged conduit $i$ and the slot-cover $f$, substantially in the manner and for the purposes set forth.

3. The platform $m$ and slobber-board $k$, when combined for the purposes set forth.

JOHN WILKINSON.

Witnesses:
WM. LOUGHRIDGE,
T. D. BARTON.